UNITED STATES PATENT OFFICE.

JOURDAN W. WOODS, OF PORTLAND, ARKANSAS.

INSECTICIDE.

No. 929,527.           Specification of Letters Patent.           Patented July 27, 1909.

Application filed March 31, 1909. Serial No. 487,077.

*To all whom it may concern:*

Be it known that I, JOURDAN W. WOODS, a citizen of the United States, residing at Portland, in the county of Ashley and State of Arkansas, have invented an Improved Insecticide, of which the following is a specification.

This invention relates to an insect destroyer and more particularly to a destroyer for the boll weevil.

My invention consists of the following ingredients, combined in the proportions stated, viz:

| | |
|---|---|
| Asafetida | One-half pound. |
| Flour | One pound. |
| Lime | One pound. |
| Cement (Portland) | One pound. |
| Sodium carbonate | One-half pound. |
| Sulfur | Three ounces. |
| Snuff | Three ounces. |
| Iodoform | One ounce. |
| Coal oil | One quart. |

These ingredients are to be thoroughly mingled by agitation, and applied to the plants infested with boll weevil or other insects, by sifting the same over the plant. The compound may also be applied to the infested plants in any other desirable manner.

Having thus described the invention, what I claim is:

The herein-described composition of matter for destroying insects consisting of the following ingredients in about the proportions stated, to wit, one-half pound of asafetida, one pound of flour, one pound of lime, one pound of cement, one-half pound of sodium carbonate, three ounces of sulfur, three ounces of snuff, one ounce of iodoform, and one quart of coal oil, substantially as specified.

JOURDAN W. WOODS.

Witnesses:
D. L. BAIN,
A. J. GREGORY.